US010105623B2

(12) United States Patent
Coyle et al.

(10) Patent No.: US 10,105,623 B2
(45) Date of Patent: Oct. 23, 2018

(54) FILTER APPARATUS

(71) Applicants: Jonathan Coyle, Coleraine (GB); Claire Coyle, Coleraine (GB)

(72) Inventors: Jonathan Coyle, Coleraine (GB); Claire Coyle, Coleraine (GB)

(*) Notice: Subject to any disclaimer, the term of this patent is extended or adjusted under 35 U.S.C. 154(b) by 84 days.

(21) Appl. No.: 14/913,460

(22) PCT Filed: Aug. 22, 2014

(86) PCT No.: PCT/EP2014/067951
§ 371 (c)(1),
(2) Date: Feb. 22, 2016

(87) PCT Pub. No.: WO2015/025057
PCT Pub. Date: Feb. 26, 2015

(65) Prior Publication Data
US 2016/0199761 A1 Jul. 14, 2016

(30) Foreign Application Priority Data
Aug. 22, 2013 (GB) .................................. 1315050.3

(51) Int. Cl.
*B01D 29/66* (2006.01)
*B01D 29/01* (2006.01)
(Continued)

(52) U.S. Cl.
CPC ............. *B01D 29/66* (2013.01); *B01D 29/01* (2013.01); *B01D 35/02* (2013.01); *E03B 1/042* (2013.01);
(Continued)

(58) Field of Classification Search
CPC ........ B01D 29/01; B01D 29/66; B01D 35/02; E03B 1/042; E03B 2001/047
(Continued)

(56) References Cited

U.S. PATENT DOCUMENTS 4,341,538 A 7/1982 Vadnay et al.
5,405,539 A * 4/1995 Schneider .............. B01D 29/07
210/163

(Continued)

FOREIGN PATENT DOCUMENTS

BE 1014664 2/2004
DE 10115019 10/2002
(Continued)

OTHER PUBLICATIONS

Machine Translation of DE 10213817.
(Continued)

*Primary Examiner* — Dirk R Bass
(74) *Attorney, Agent, or Firm* — Preston Smirman; Smirman IP Law, PLLC

(57) ABSTRACT

A filter apparatus comprising an inlet for receiving a target fluid to be filtered, an outlet for allowing exit of filtered target fluid and a filter plate disposed between the inlet and the outlet. The filter plate having a lengthwise direction and a widthwise direction and the inlet being disposed proximal one portion of the filter plate for delivering at least some of the fluid onto the filter means initially in a lengthwise direction along the filter plate. The outlet being disposed on an opposing portion of the filter plate in the lengthwise direction and at a distance just below the inlet such that the filter apparatus maintains a low profile in a heightwise direction.

26 Claims, 10 Drawing Sheets

(51) Int. Cl.
*E03B 1/04* (2006.01)
*B01D 35/02* (2006.01)

(52) U.S. Cl.
CPC ....... *E03B 2001/047* (2013.01); *Y02A 20/108* (2018.01)

(58) Field of Classification Search
USPC ........................................................ 210/410
See application file for complete search history.

(56) References Cited

U.S. PATENT DOCUMENTS

| | | | |
|---|---|---|---|
| 5,593,585 A | | 1/1997 | Groetzinger |
| 5,779,888 A | * | 7/1998 | Bennett .................. B01D 29/05 210/162 |
| 8,287,726 B2 | * | 10/2012 | Williams ............... B01D 35/10 210/108 |

FOREIGN PATENT DOCUMENTS

| | | |
|---|---|---|
| DE | 10213817 | 10/2003 |
| EP | 2298429 | 3/2011 |
| GB | 2469017 | 10/2010 |
| WO | 9809708 | 3/1998 |

OTHER PUBLICATIONS

Machine Translation of BE 1014664.
Machine Translation of EP 2298429.
Machine Translation of DE 10115019.
International Search Report dated Feb. 5, 2015.
Written Opinion of the International Searching Authority dated Feb. 5, 2015.
International Preliminary Report on Patentability dated Dec. 1, 2015.

* cited by examiner

FILTER APPARATUS

CROSS-REFERENCE TO RELATED APPLICATION

The instant application is a national phase of PCT International Application No. PCT/EP2014/067951 filed Aug. 22, 2014, and claims priority to GB Patent Application Serial No. 1315050.3 filed Aug. 22, 2013, the entire specifications of both of which are expressly incorporated herein by reference.

The present invention relates to a filter apparatus and in particular to a filter apparatus for reclamation of water.

As water becomes an increasingly valuable resource, the reclamation of used water or water that would otherwise be lost into the ground, such as rain water, is becoming an increasingly attractive proposition.

Solutions exist to capture and filter a portion of the rainwater that falls upon a property and channel this reclaimed water for use in the general plumbing of a residence, business, or other such facility. These solutions typically require a filter to remove any debris such as leaves, soil, or other organic or inorganic matter from the water before passing it on to be utilized. Filters of this type require exposure of the water to be filtered to some sort of filter medium, typically a sheet or plate, and the requirement that the exposure is sufficient to allow enough water to pass through the filter medium generally results in these types of devices being relatively large. This problem is further exaggerated when large flow rate devices are concerned.

Not only are the devices large as a result of the exposure requirement, but a satisfactory drop is required between an inlet and an outlet, and also between an inlet and an overflow outlet which permits exit of excess water not filtered and debris out of the device. These fall levels in currently available devices can be quite large resulting in deep overall profiles which can be an issue where the filter is designed to be buried underground.

Another issue with current filter designs in this field is that the debris or other such foreign matter filtered from the water often at least partially remains on the filter plate, reducing the effectiveness of the filter plate over time. Some solutions exist in the form of spray nozzles which periodically spray the filter plate in order to encourage the debris to move towards and out of the overflow, however the configuration of such jets allows for dead zones on the filter plate where the jets do not reach and where, as a result, debris can still build and impact efficiency. The outcome of this is an increased requirement for maintenance in the form of physically accessing the filter plate and manually removing any debris build-up. This can be messy and particularly inconvenient where the filter is stored underground.

It is an object of the present invention to obviate or mitigate the problem of providing for efficient filtration of water and further facilitating the efficient removal of a maximal amount of waste thus reducing maintenance requirements.

Accordingly, the present invention provides a filter apparatus comprising an inlet for receiving a target fluid to be filtered, an outlet for allowing exit of filtered target fluid, a filter means disposed between the inlet and the outlet, the filter means having a lengthwise direction and a widthwise direction, the inlet being disposed proximal one portion of the filter means so as to deliver at least some of the fluid onto the filter means initially in a lengthwise direction along the filter means, the outlet being disposed on an opposing portion of the filter means in the lengthwise direction and a distance below the inlet portion such that the filter apparatus maintains a low profile in a heightwise direction.

Advantageously, as the filter has a low profile in a heightwise direction it is easier to deploy for underground use.

Further advantageously, as the fluid is delivered onto the filter means in a lengthwise direction and the outlet is disposed on a portion of the filter apparatus opposing the inlet, a high flow through rate can be achieved.

Ideally, all or part of the outlet being disposed below the filter means.

Preferably, the filter means extends to all or substantially all of the path of flow of the target fluid as it travels from the inlet to the outlet.

Ideally, the inlet is locatable proximal to one lateral edge of the filter apparatus.

Preferably, the inlet is locatable proximal to one lateral edge of the filter means.

Ideally, the outlet has a lower boundary and an upper boundary.

Preferably, the inlet has a lower boundary and an upper boundary.

Ideally, the lower boundary of the inlet and the upper boundary of the outlet are in alignment with the filter means.

Preferably, the filter apparatus has overflow output means for disposal of overflow fluid and/or waste filtered from the target fluid.

Ideally, the overflow output means extends along all or part of one portion of the filter means extending between the inlet and the outlet.

Ideally, the overflow output means extends along all or part of one side of the filter means extending between the two opposing sides having the inlet and the outlet.

Preferably, an outlet of the overflow output means is locatable proximal the outlet for the filtered target fluid.

Preferably, the outlet of the overflow output means is locatable on the same side of the filter apparatus as the outlet for the filtered target fluid.

Alternatively, the outlet of the overflow output means is locatable on the same side of the filter apparatus as the inlet for the filtered target fluid.

Ideally, the filter apparatus has urging means for urging the waste filtered from the target fluid towards the overflow output means.

Preferably, the urging means comprises at least part of a fluid carrying surface of the filter means being downwardly inclined towards the overflow output means.

Ideally, the urging means comprises flushing means for flushing the waste across the fluid carrying surface of the filter means towards the overflow output means.

Ideally, the flushing means comprises an inlet for receiving flushing fluid.

Preferably, the flushing means has means for pressurizing the flushing fluid in operable engagement therewith.

Ideally, the flushing means has at least one outlet which influences the pressure and/or shape/and/or direction of the flushing fluid upon exiting the at least one outlet of the flushing means.

Preferably, the shape/configuration of the at least one flushing means outlet is designed so that no areas of the fluid carrying surface of the filter means are unreachable by the flushing fluid.

Preferably, the at least one outlet of the flushing means is an elongate outlet.

Ideally, the at least one outlet of the flushing means is an elongate slot.

Preferably, the flushing means has two outlets.

Preferably, the at least one outlet of the flushing means extends along a portion of the flushing means above the fluid carrying surface of the filter means.

Ideally, the at least one outlet of the flushing means is at least one quadrangular fluid jet.

Preferably, the at least one quadrangular fluid jet is configured to direct fluid in a stream or wave or sheet across the entire surface of the filter means for at least part of the flushing operation.

Ideally, the means for pressurizing the flushing fluid comprises a pump or other such means for pressurizing flushing fluid in at least a portion of the flushing means.

Preferably, the flushing means comprises a chamber, the chamber being enclosed and having an opening in fluid connection with an inlet for receiving flushing fluid and an opening in fluid connection with the at least one outlet of the flushing means.

Advantageously, the pump pressurizes the flushing fluid in at least a portion of the flushing means, a quantity of flushing fluid is thereafter forced through the at least one outlet of the flushing means and towards the fluid carrying surface of the filter means.

Preferably, the flushing means is manufactured from a plastic material.

Ideally, the flushing means is a moulded plastic component.

Preferably, the flushing means is manufactured from more than one component.

Ideally, the flushing means comprises a front plate having the at least one outlet formable therein.

Preferably, the flushing means has a rear plate having the inlet for receiving flushing fluid formable therein.

Ideally, the flushing means has a spacing means locatable between the front plate and rear plate.

Preferably, the spacing means extends around the peripheral portions of the opposing surfaces of the front and rear plates defining a substantially enclosed volume.

Ideally, the spacing means has a central aperture.

Preferably, the shape of the chamber of the flushing means is defined by the shape of the aperture in the spacing means.

Advantageously, when the spacing means is located between the front and rear plates it creates a continuous join between the front and rear plate around the periphery of the front and rear plate but forms a chamber therebetween encompassing at least the portion of the rear plate having the inlet and the portion of the front plate having the at least one outlet.

Ideally, the front plate, rear plate, and spacing plate are secured together by fasteners.

Preferably, the fasteners are insertable through correspondingly located throughbores formed in the front plate, rear plate, and spacing plate.

Alternatively, the front plate, rear plate, and spacing plate are secured together by adhesive/bonding/glue or welding.

Alternatively, the front plate, rear plate, and spacing plate are secured together by clamping means.

Alternatively, the flushing means comprises a one piece component.

Preferably, the flushing means comprises a one piece moulded plastic component.

Ideally, the flushing means is locatable such that the at least one outlet thereof is locatable above the filter means.

Preferably, the flushing means is locatable such that the at least one outlet thereof is locatable proximal to the uppermost portion of the filter means.

Ideally, the flushing means is locatable on a side wall of the filter apparatus.

Preferably, the flushing means is locatable on a side wall of the filter apparatus, said side wall spanning between the inlet and the outlet of the filter apparatus.

Ideally, the flushing means is integratable into or formed integrally with a side wall of the filter apparatus.

Preferably, the overflow output means comprises a channel extending along all or part of the portion of the filter means extending between the inlet and the filtered target fluid outlet.

Preferably, the overflow output means comprises a channel extending along all or part of the portion of the filter means extending between the two opposing sides having the inlet and the filtered target fluid outlet.

Preferably, the channel is downwardly inclined towards the outlet of the overflow output means. By inclined we mean inclined away from a horizontal plane to encourage or assist flow of water or waste.

Ideally, the channel is downwardly inclined in a direction from the inlet of the filter apparatus to the outlet of the overflow output means.

Ideally, the target fluid is water.

Preferably, the filter apparatus has a filtered water delivery means for delivering filtered water from proximal the inlet to the filtered water outlet.

Ideally, the filtered water delivery means comprises an inclined channel extending downwardly from a location below the inlet and filter means to the filtered water outlet.

Preferably, the filtered water delivery means extends below all or a substantial part of the filter means.

Ideally, all or part of the fluid carrying surface of the filter means is downwardly inclined in at least a widthwise direction towards the overflow output means.

Preferably, the overflow output means is disposed in a lengthwise direction of initial flow of target fluid, but offset laterally with regards to the axial direction of the inlet.

Advantageously, as the overflow output means is disposed offset laterally from the inlet but in the same direction as the flow of target fluid, the filter apparatus can facilitate large volume flowthrough while the fluid to be filtered experiences an extended time exposed to the filter means prior to exit via the overflow output means when compared to a non-laterally offset overflow filter apparatus of the same length.

Further advantageously, as the overflow output means is disposed laterally offset from the inlet, the outlet can be located at a reduced vertical distance from the inlet thus allowing the filter apparatus to have an overall lower vertical profile and facilitate installation in situations where such a low profile is advantageous.

Preferably, the filtered water outlet is locatable below the filter means.

Preferably, at least part of the water carrying surface of the filter means is downwardly inclined at an angle from a horizontal reference plane.

Preferably, at least a portion of the outlet is locatable in the direction of flow of the target fluid.

Ideally, the outlet is locatable above the lowest point of the downwardly inclined filter means, but beneath at least a portion of the filter means.

Preferably, at least a portion of the outlet is locatable above the lowest point of the downwardly inclined filter means, but beneath at least a portion of the filter means, and in the direction of flow of the target fluid.

Ideally, in use, the lowest portion of the outlet is disposed below the lowest portion of the inlet at a distance greater than 60 mm.

Ideally, in use, the lowest portion of the outlet is disposed below the lowest portion of the inlet at a distance greater than 120 mm.

Preferably, in use, the lowest portion of the outlet is disposed below the inlet at a distance greater than 150 mm.

Ideally, in use, the lowest portion of the outlet is disposed below the lowest portion of the inlet at a distance greater than 180 mm.

Preferably, in use, the lowest portion of the outlet is disposed below the lowest portion of the inlet at a distance less than 310 mm.

Ideally, in use, the lowest portion of the outlet is disposed below the lowest portion of the inlet at a distance less than 280 mm.

Preferably, in use, the lowest portion of the outlet is disposed below the lowest portion of the inlet at a distance less than 250 mm.

Most preferably, in use, the lowest portion of the outlet is disposed below the lowest portion of the inlet at a distance of 80 mm.

Ideally, the surface of the inlet and surface of the outlet pipework carrying the fluid into and out of the filter apparatus respectively are inclined away from the horizontal within a range of angles from 0 degrees to 50 degrees.

Ideally, in use, the highest portion of the outlet is disposed below the lowest portion of the inlet at a distance greater than 4 mm.

Preferably, in use, the highest portion of the outlet is disposed below the lowest portion of the inlet at a distance greater than 5 mm.

Ideally, in use, the highest portion of the outlet is disposed below the lowest portion of the inlet at a distance less than 30 mm.

Preferably, in use, the highest portion of the outlet is disposed below the lowest portion of the inlet at a distance less than 15 mm.

Most preferably, in use, the highest portion of the outlet is disposed below the lowest portion of the inlet at a distance of 6 mm.

Ideally, the center of the overflow outlet is disposed below the center of the inlet at a distance less than 100 mm Preferably, the center of the overflow outlet is disposed below the center of the inlet at a distance less than 120 mm.

Ideally, the center of the overflow outlet is disposed below the center of the inlet at a distance greater than 40 mm.

Preferably, the center of the overflow outlet is disposed below the center of the inlet at a distance greater than 60 mm.

Most preferably, the center of the overflow outlet is disposed below the center of the inlet at a distance of 80 mm.

Ideally, the surface of the inlet and surface of the overflow output carrying the fluid into and out of the filter apparatus respectively are inclined away from the horizontal within a range of angles from 0 degrees to 50 degrees.

Ideally, in use, the main axis of the overflow output means is disposed below the inlet and at a distance greater than 350 mm laterally from the main axis of the inlet.

Preferably, in use, the main axis of the overflow output means is disposed below the inlet and at a distance greater than 400 mm laterally from the main axis of the inlet.

Ideally, in use, the main axis of the overflow output means is disposed below the inlet and at a distance less than 550 mm laterally from the main axis of the inlet.

Preferably, in use, the main axis of the overflow output means is disposed below the inlet and at a distance less than 500 mm laterally from the main axis of the inlet.

Most preferably, in use, the main axis of the overflow output means is disposed below the inlet and at a distance 450 mm laterally from the main axis of the inlet.

Preferably, the urging means is configured to urge the waste filtered from the target fluid towards the overflow output means and/or out through the outlet of the overflow output means.

Ideally, the urging means is configured to urge the waste filtered from the target fluid from the entire surface of the filter means.

Ideally, the flushing means is locatable above the filter means.

Preferably, the flushing means comprises a means for generating a stream of fluid.

Ideally, the fluid stream generating means is capable of generating a stream of high pressure fluid.

Ideally, the flushing means comprises at least one quadrangular fluid jet.

Preferably, the at least one quadrangular fluid jet is configured to direct fluid in a stream or wave or sheet across the entire waste contacting surface of the filter means for at least part of the flushing operation.

Ideally, the flushing means further comprises a transport means for facilitating movement of the flushing means.

Preferably, the transport means is configured to move the flushing means so that the fluid ejected therefrom encourages the waste on the filter means to move along the filter means towards the overflow output means and/or out through the outlet of the overflow output means.

Ideally, the transport means is a fluid jet bar which spans the length or width of the filter means.

Preferably, the transport means is capable of traversing the length or width of the filter means from a portion of the filter means closest the inlet to a portion closest the overflow outlet means.

Ideally, the fluid jets provide an area of contact across the length or width of the filter means thereunder.

Advantageously, the entire surface of the filter means is contacted by the fluid jets of the flushing means, ensuring that no portions of the filter means is left to gather a build-up of waste and that the entire filter means is clear after each flushing operation.

Ideally, the inlet, filtered water outlet, and/or the outlet of the overflow output means are connectable to fluid conduits of a system into which the filter apparatus is integrated.

Preferably, the fluid conduits are connectable to the inlet, filtered water outlet, and/or the outlet of the overflow output means by push-on connection means.

Ideally, the push-on connection means have a seal means therein for creating a fluid proof seal between the fluid conduit and the inlet, filtered water outlet, and/or the outlet of the overflow output means.

Ideally, the inlet, filtered water outlet, or overflow outlet are tubular conduits or pipes.

Preferably, the seal means is disposable on the inlet, filtered water outlet, and/or the outlet of the overflow output means, or on the fluid conduit connectable thereto.

Ideally, a recess is formed on the inlet, filtered water outlet, and/or the output of the overflow output means, or on the fluid conduit connectable thereto for receiving the seal means.

Preferably, the seal means is locatable in the recess of the inlet, outlet, and/or overflow output means, or on the fluid conduit connectable thereto but projects from the recess at least a portion.

Advantageously, when the inlet, outlet, and/or overflow output means is connected to the fluid conduit, the seal means forms a seal therebetween.

Alternatively, the seal means is a push fit seal means.

Further alternatively, the seal means is provided by a bonded seal.

Ideally, the seal means is a gasket.

Preferably, the seal means is a rubber seal means.

Ideally, the seal means are seal rings for acting between a fluid conduit connectable to the filter apparatus and the inlet and/or filtered water outlet and/or overflow outlet.

Preferably, the base of the filter apparatus has ground engaging means.

Ideally, the ground engaging means are fixed ground engaging means.

Preferably, the ground engaging means are formed integrally with the body of the filter apparatus.

Alternatively, the filter apparatus has at least one positional adjustment means Preferably, the at least one positional adjustment means is locatable on the filter apparatus when in use.

Ideally, the at least one positional adjustment means has filter apparatus attachment portion.

Preferably, the at least one positional adjustment means has surface contact means configured for contacting the surface upon which the filter apparatus is situated during use.

Preferably, a spacer means is disposable between the filter apparatus attachment portion and the surface contact means.

Ideally, the spacer means between the filter apparatus attachment portion and the surface contact means is adjustable such that the filter apparatus attachment portion and the surface contact means can be moved closer together or farther away from each other by adjustment of the spacer means.

Preferably, the positional adjustment means comprises a threaded screw.

Ideally, the threaded screw is engagable with a correspondingly threaded bore formed on the filter apparatus.

Preferably, the threaded screw has the surface contact means locatable at its end distal the end threadable into the filter apparatus.

Advantageously, the threaded screw can be threaded into/out of the bore as required to adjust the overall height of the positional adjustment means.

Ideally, there is a plurality of positional adjustment means.

Preferably, each positional adjustment means is adjustable independently.

Advantageously, the plurality of positional adjustment means can be independently adjusted to create a level or otherwise desired orientation of the filter apparatus.

Ideally, the plurality of positional adjustment means comprise adjustable feet mounted on the base of the filter apparatus.

Preferably, the filter means has securing means for securing the filter means to at least one other component of the filter apparatus.

Advantageously, the filter means is held in place by the securing means and as a result cannot move during times of high flowthrough or if the filter apparatus is disturbed.

Ideally, the filter means permits the passage of fluid therethrough while preventing the passage of debris and other such contaminants of the fluid.

Preferably, the filter means comprises a plate having cut-outs therein for allowing passage of fluid.

Ideally, the filter means is a quadrangular plate, most preferably rectangular.

Ideally, the through cut-outs are small enough in size to prevent the passage of undesirable debris and contaminants.

Preferably, the through cut-outs are large enough in size to permit a sufficient amount of fluid to pass therethrough during the time period the fluid is exposed to the filter means.

Ideally, the filter means is manufactured from a metallic material.

Preferably, the filter means is manufactured from a non-corrosive material.

Ideally, the filter means is manufactured from a plastic material.

Preferably, the filter means is manufactured from a material having anti-microbial properties.

Alternatively, the filter means is coated in an anti-microbial material.

Advantageously, the anti-microbial properties of the filter means prevents microbial growth on the filter means which would otherwise decrease the efficiency of the filter means and potentially contribute to contamination of the filtered fluid.

Ideally, the filter apparatus comprises an upper closure means.

Preferably, the upper closure means is maintained in position by compression.

Advantageously, the upper closure means protects the interior of the filter apparatus including the filter means from ingress of foreign matter, especially where the filter apparatus is buried underground.

Ideally, the filter apparatus is integratable into a system wherein fluid requires filtering.

Preferably, the filter apparatus is integratable in a plumbing installation, water reclamation installation, water treatment facility, or any other such facility where treatment of a fluid via filtering is advantageous.

Ideally, the filter apparatus is locatable below ground.

Ideally, the fluid to be filtered is water.

The invention will now be described with reference to the accompanying drawings which show by way of example two embodiments of an apparatus in accordance with the invention. In the drawings.

Figure 1:
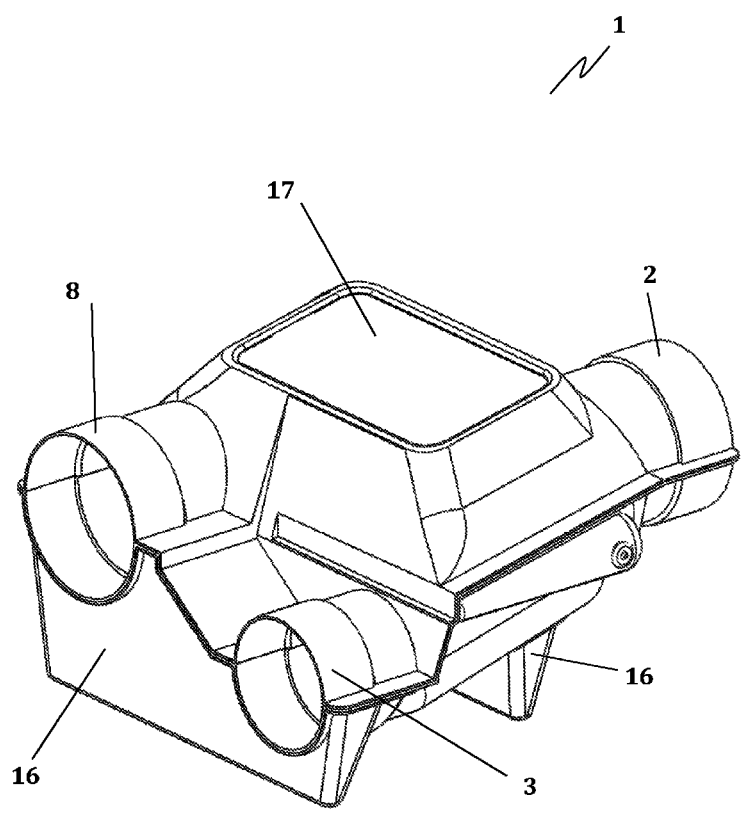
FIG. 1 is a perspective view of a first embodiment of the filter apparatus.
Figure 2:
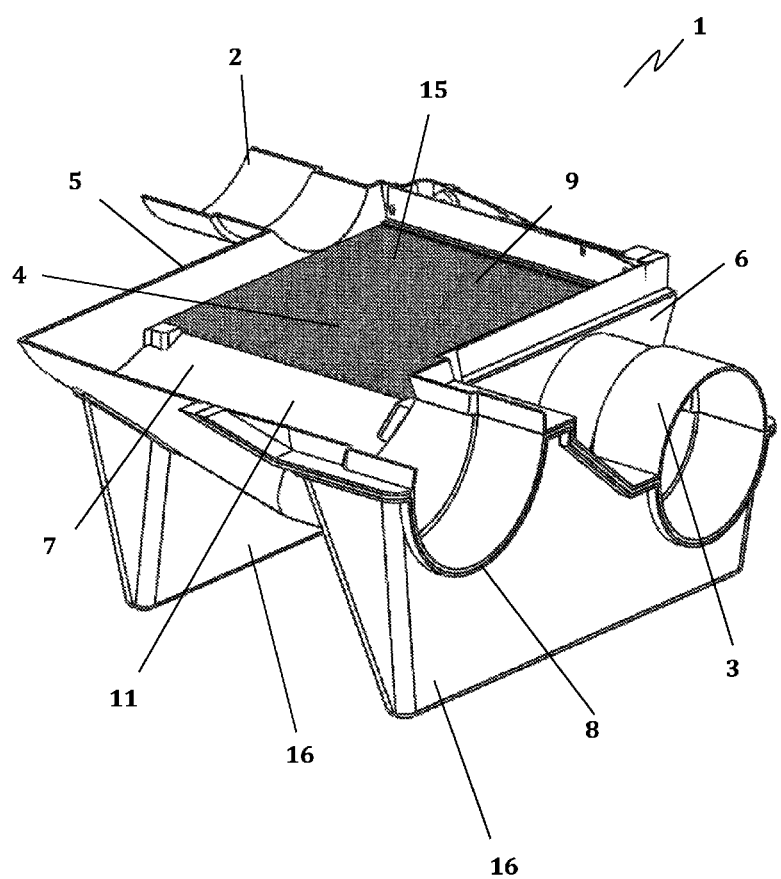
FIG. 2 is perspective view of a horizontal sectional view of a first embodiment of the filter apparatus.
Figure 3:
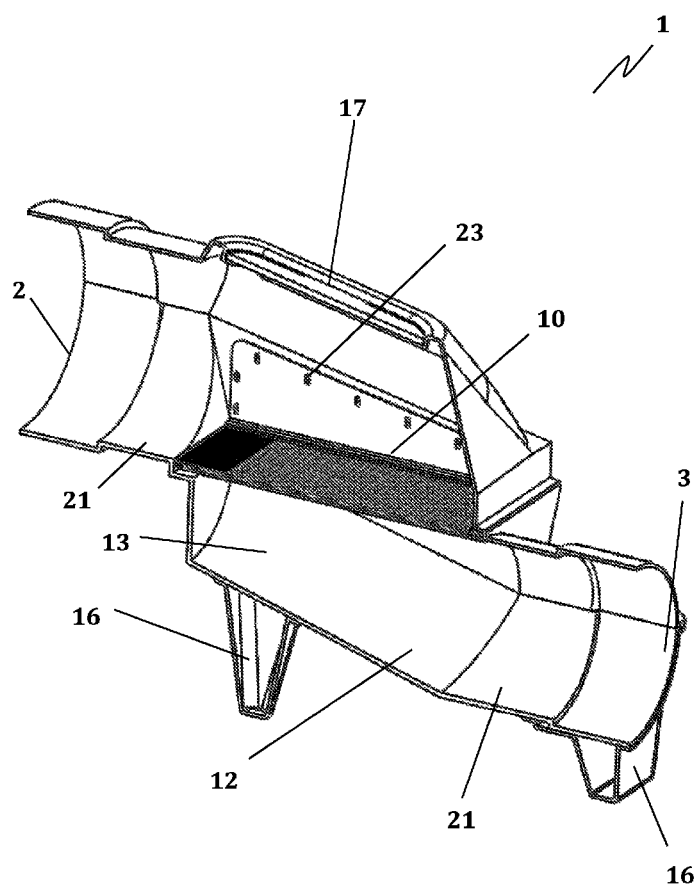
FIG. 3 is a perspective view of a vertical sectional view of a first embodiment of the filter apparatus showing the inlet and the outlet.
Figure 4:
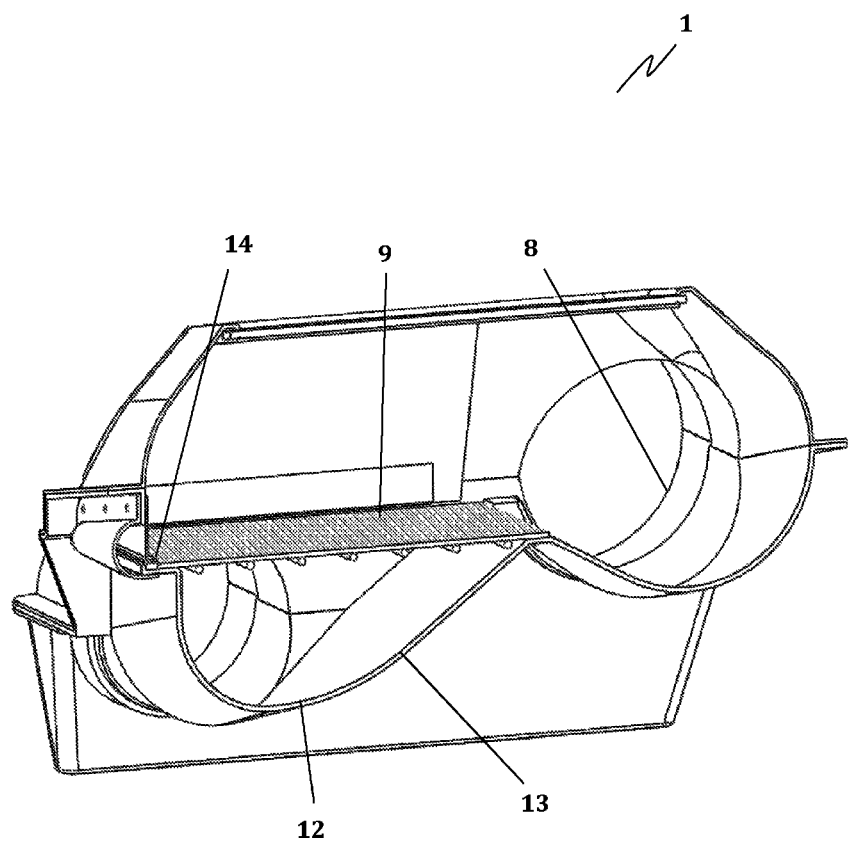
FIG. 4 is a perspective view of a vertical sectional view of a first embodiment of the filter apparatus showing the outlet and the overflow output.

In the drawings, there is shown a first embodiment of the filter apparatus as shown in FIGS. 1 to 4 indicated generally by the reference numeral 1 having an inlet 2 for receiving water to be filtered, an outlet 3 for allowing exit of filtered water, a filter plate 4 disposed between the inlet 2 and the outlet 3. The filter plate 4 has a lengthwise direction and a widthwise direction, the inlet 4 being disposed on a side 5 of the filter plate 4 so as to deliver at least some of the water onto the filter plate 4 initially in a lengthwise direction along the filter plate 4. The outlet 3 being disposed on the opposite side 6 and below the filter plate 4 and a distance below the inlet 2 such that the filter apparatus 1 maintains a low profile in a heightwise direction.

The filter apparatus 1 has an overflow output 7 for disposal of overflow water and waste filtered from the water, the overflow output 7 has a channel portion 11 which extends along the filter plate 4 extending between the sides 5, 6, having the inlet 2 and the outlet 3, and has an outlet 8 locatable on the side of the filter apparatus 6 having the outlet 3 for the filtered water. The overflow output 7 is disposed in direction of flow of water, but offset laterally with regards to the axial direction of the inlet 2.

The filter apparatus 1 has a filtered water delivery member 12 comprising an inclined channel 13 extending downwardly from a location below the inlet 2 and filter plate 4 to the filtered water outlet 3. The filtered water delivery member 12 extends below all or a substantial part of the filter plate 4. Advantageously, this means that all the water filtered through the filter plate 4 is delivered via the inclined channel 13 to the outlet 3.

The lowest portion 21 of the outlet 3 is disposed below the lowest portion 22 of the inlet 2 at a distance ranging between 60 mm to 310 mm, and the overflow output 7 is disposed below the inlet 2 and at a distance ranging between 350 mm to 500 mm laterally from the main axis of the inlet 2.

The filter apparatus 1 is capable of urging waste filtered from the water towards the overflow output 7 via a fluid carrying surface 9 of the filter plate 4 which is downwardly inclined towards the overflow output 7. The urging of waste is further aided by a flushing arrangement 10 for flushing the waste across the fluid carrying surface 9 of the filter plate 4 towards the overflow output 7. The channel 11 of the overflow output 7 is downwardly inclined in a direction from the side 5 of the filter apparatus 1 having the inlet 2 to the side 6 of the filter apparatus 1 having the outlet 3.

The flushing arrangement 10 is located above the filter plate 4 and comprises a quadrangular fluid jet member 14 configured to direct fluid in a stream, sheet, or wave across the entire waste contacting surface 9 of the filter plate 4 during the flushing operation. As a result, the entire surface of the filter plate 4 is contacted by the fluid jet of the flushing arrangement 10, ensuring that no portions of the filter plate 4 is left to gather a build-up of waste and that the entire filter plate 4 is clear after each flushing operation.

The filter plate 4 has securing members 23 for securing the filter plate 4 to the filter apparatus 1. The filter plate 4 permits the passage of water therethrough while preventing the passage of debris and other such contaminants of the water and comprises a flat plate 15 having cut-outs (not shown) therein for allowing passage of water, the cut-outs being small enough in size to prevent the passage of undesirable debris and contaminants but large enough in size to permit a sufficient amount of water to pass therethrough during the time period the water is exposed to the filter plate 4. The filter plate 4 is manufactured from a non-corrosive material having anti-microbial properties in the form of a coating (not shown), preventing microbial growth on the filter plate 4 which would otherwise decrease the efficiency of the filter plate 4 and potentially contribute to contamination of the filtered water.

The filter apparatus 1 further comprises feet members 16 for levelling and securing the filter apparatus 1, and a lid 17 which encloses the interior portion of the filter apparatus having the filter plate 4, especially useful in underground installations.

Figure 5:
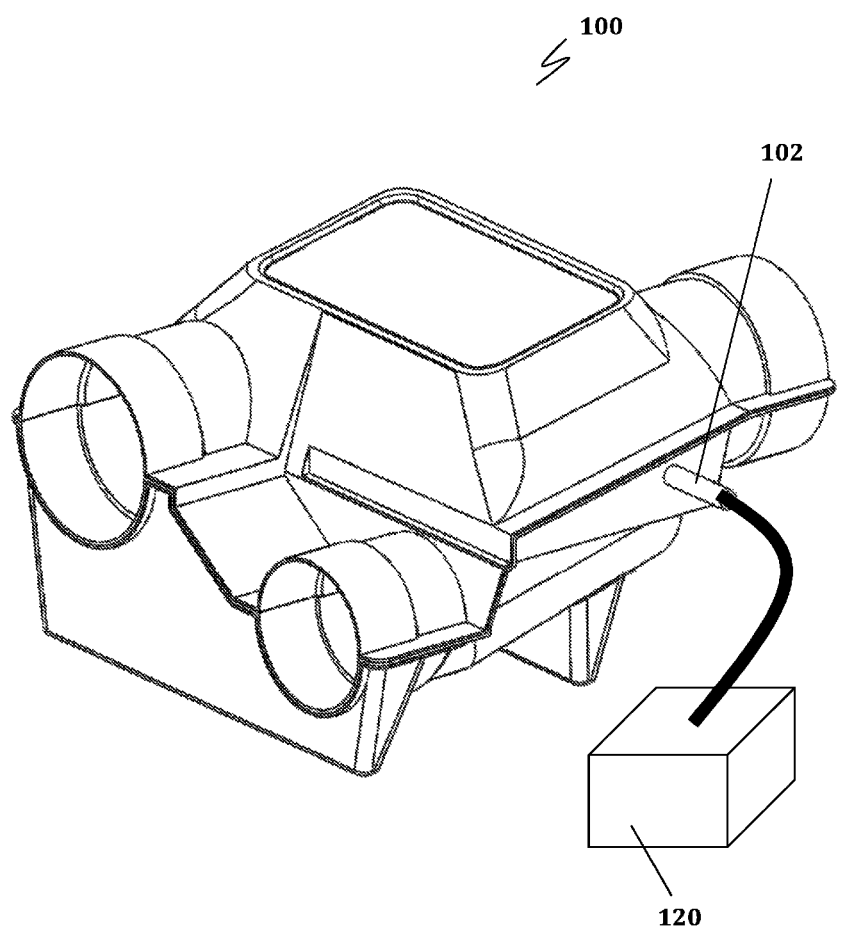
FIG. 5 is a perspective view of a second embodiment of the filter apparatus.
Figure 6:
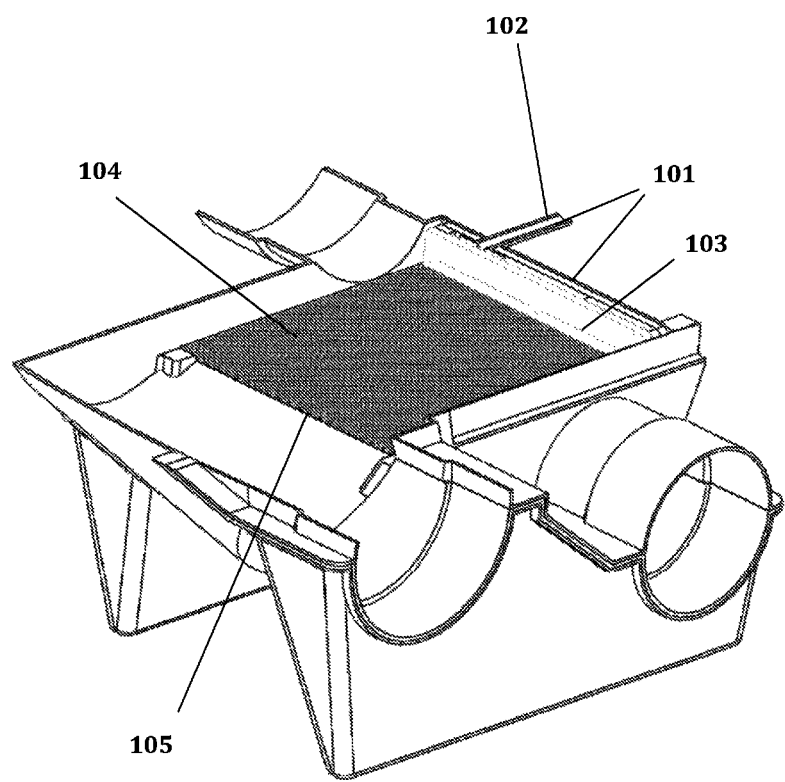
FIG. 6 is perspective view of a horizontal sectional view of a second embodiment of the filter apparatus.
Figure 7:
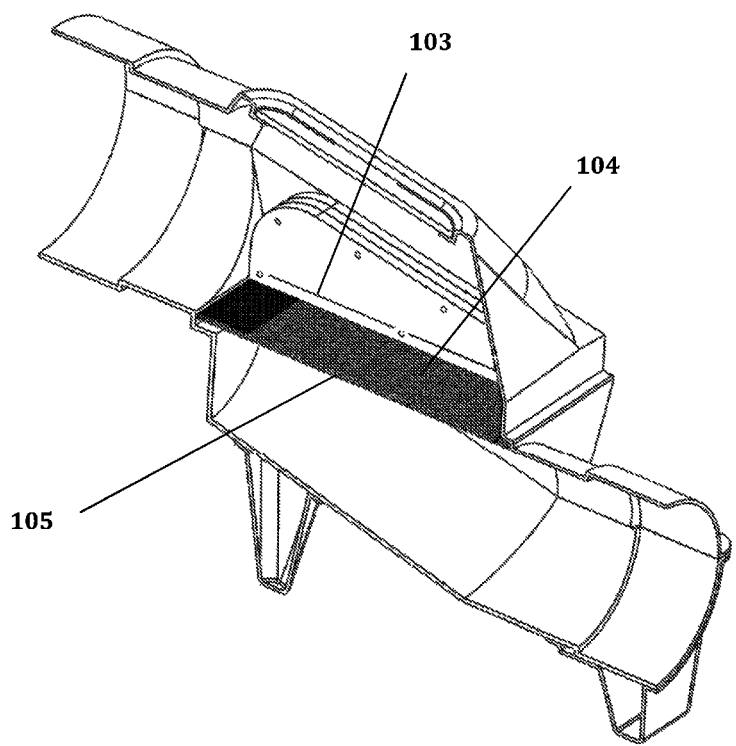
FIG. 7 is a perspective view of a vertical sectional view of a second embodiment of the filter apparatus showing the inlet and the outlet.
Figure 8:
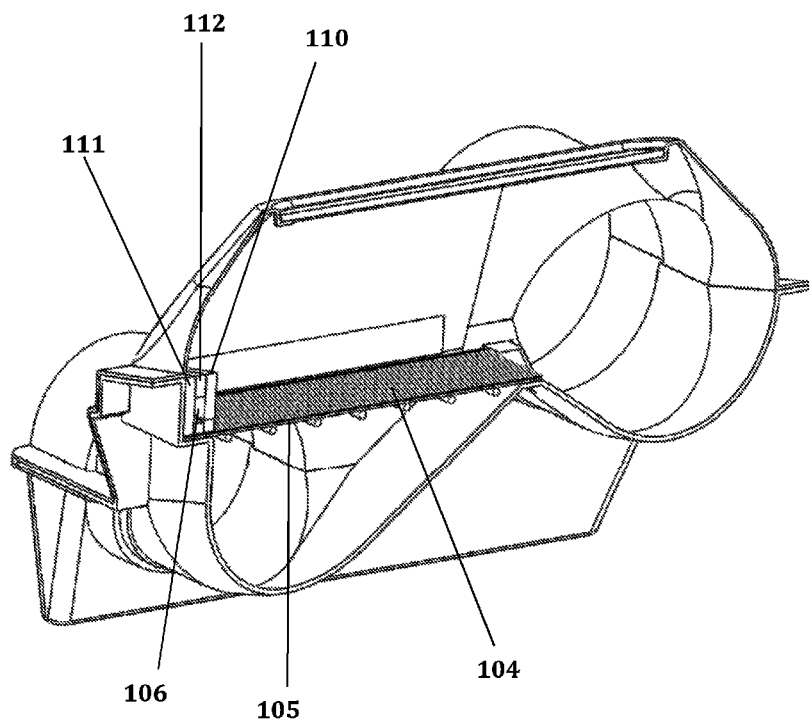
FIG. 8 is a perspective view of a vertical sectional view of a second embodiment of the filter apparatus showing the outlet and the overflow output.
Figure 9:
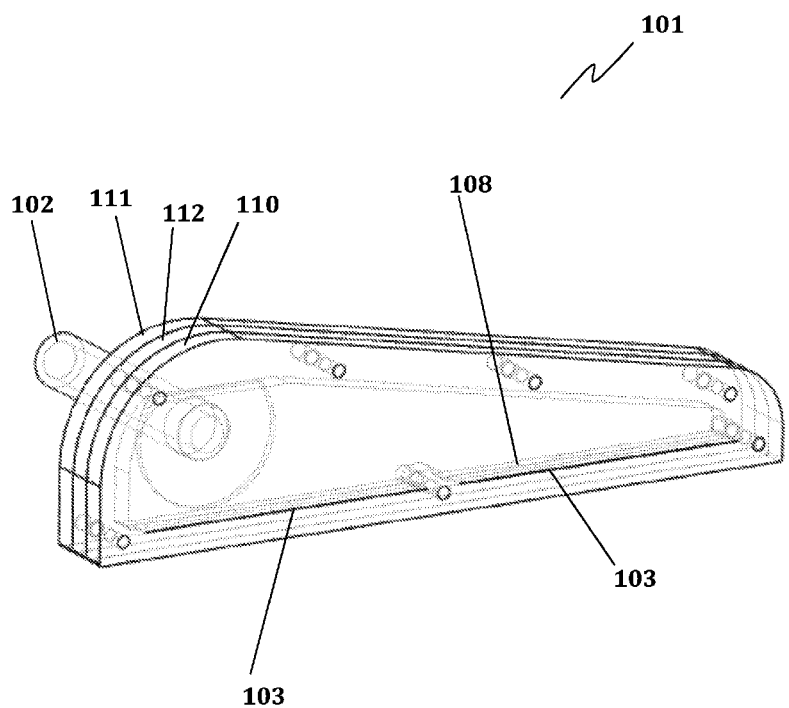
FIG. 9 is a perspective view of the flushing assembly of a second embodiment of the filter apparatus.
Figure 10:
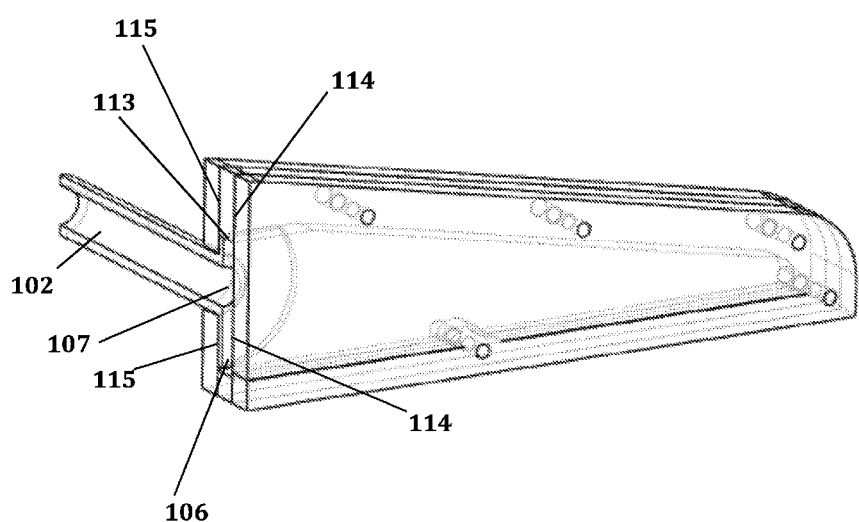
FIG. 10 is a perspective view of the flushing assembly of a second embodiment of the filter apparatus having a vertical section through the inlet of the flushing means.

In the drawings, there is shown a second embodiment of the filter apparatus 100 as shown in FIGS. 5 to 10, wherein the flushing arrangement 101 comprises an inlet 102 for receiving flushing fluid and a pump 120 for pressurizing the flushing fluid received by the inlet 102. The flushing arrangement 101 has two elongate outlets 103 which ensure the shape and direction of the flushing fluid upon exiting the flushing arrangement 101 through the outlets 103. The elongate nature of these outlets ensure that no areas of the fluid carrying surface 104 of the filter plate 105 are unreachable by the flushing fluid thereby preventing build-up of debris.

The flushing arrangement 101 comprises a chamber 106 (see FIGS. 8 and 10), the chamber 106 being enclosed and having an opening 107 in fluid connection with the inlet 102 and at least one opening 108 in fluid connection with the outlets 103 of the flushing arrangement 101. In use, the pump 120 forces flushing fluid into the inlet 102 of the flushing arrangement 101 and on into the chamber 106. A quantity of flushing fluid is forced through the outlet 103 of the flushing arrangement 101 and towards the fluid carrying surface 104 of the filter plate 105, washing waste therefrom.

The flushing arrangement 101 is manufactured from a moulded plastic material and comprises a front plate 110 having the outlets 103 formed therein and a rear plate 111 having the inlet 102 formed therein. A spacing plate 112 is located between the front plate 110 and rear plate 111 and has an aperture 113 therein such that the spacing plate 112 creates a continuous join around the peripheral portions of the opposing surfaces 114, 115 of the front and rear plates 110, 111 while forming the chamber 106 which is defined by the shape of the aperture 113 in the spacing plate 112. The front plate, rear plate, and spacing plate are secured together in the above described configuration by fasteners (not shown) insertable through correspondingly located throughbores 116 formed in the front plate 110, rear plate 111, and spacing plate 112.

In relation to the detailed description of the different embodiments of the invention, it will be understood that one or more technical features of one embodiment can be used in combination with one or more technical features of any other embodiment where the transferred use of the one or more technical features would be immediately apparent to a person of ordinary skill in the art to carry out a similar function in a similar way on the other embodiment.

In the preceding discussion of the invention, unless stated to the contrary, the disclosure of alternative values for the upper or lower limit of the permitted range of a parameter, coupled with an indication that one of the said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:

1. A water filter apparatus, comprising:
an inlet for receiving water to be filtered;
an outlet for allowing passage of water;
a filter means disposed between the inlet and the outlet;
the filter means having a lengthwise direction and a widthwise direction;
the inlet being disposed proximal one portion of the filter means for delivering at least some of the water onto the filter means initially in a lengthwise direction along the filter means;
wherein the outlet is disposed on an opposing portion of the filter means in the lengthwise direction, the outlet being disposed a distance just below the inlet such that the water filter apparatus maintains a low profile in a heightwise direction;
wherein the water filter apparatus has overflow output means for disposal of overflow water and waste filtered from the water;
wherein the overflow output means extends along all or part of one side of the filter means extending between the two opposing sides having the inlet and the outlet, the filter means comprising a flat plate having cut-outs therein for allowing passage of water;
wherein the overflow output means further comprises an outlet; and
wherein the bottom of the overflow output means outlet is positioned lower than the entire filter means such that, in use, overflow water, waste and debris is unobstructed as it moves downwards from the inlet, over the filter means and out the overflow output means outlet.

2. The water filter apparatus as claimed in claim 1, wherein the outlet of the overflow output means is locatable proximal the outlet or inlet of the water filter apparatus.

3. The water filter apparatus as claimed in claim 1, wherein the overflow output means comprises a channel.

4. The water filter apparatus as claimed in claim 3, wherein the channel extends along all or part of the portion of the filter means extending between the two opposing sides having the inlet and the filtered water outlet.

5. The water filter apparatus as claimed in claim 1, wherein the overflow output means is downwardly depending in a direction towards the outlet of the overflow output means.

6. The water filter apparatus as claimed in claim 1, wherein the water filter apparatus has urging means for urging the waste filtered from the water towards the overflow output means.

7. The water filter apparatus as claimed in claim 6, wherein the urging inclined towards the overflow output means.

8. The water filter apparatus as claimed in claim 7, wherein the urging means comprises flushing means for flushing the waste across the fluid carrying surface of the filter means towards the overflow output means.

9. The water filter apparatus as claimed in claim 8, wherein the flushing means is locatable above the filter means and comprises a means for generating at least one stream of fluid.

10. The water filter apparatus as claimed in claim 9, wherein the fluid stream generating means is capable of generating a stream of high pressure fluid.

11. The water filter apparatus as claimed in claim 8, wherein the flushing means directs the fluid in at least one stream or wave or sheet across the entire or substantially all of the waste contacting surface of the filter means for at least part of the flushing operation.

12. The water filter apparatus as claimed in claim 8, wherein the flushing means comprises an inlet for receiving flushing fluid, a means for pressurizing the flushing fluid in operable engagement therewith, and at least one outlet which influences the pressure or shape or direction of the flushing fluid upon exiting the at least one outlet of the flushing means.

13. The water filter apparatus as claimed in claim 12, wherein the at least one means comprises at least part of a fluid carrying surface of the filter means being downwardly outlet of the flushing means is an elongate outlet extending along a portion of the flushing means above the fluid carrying surface of the filter means.

14. The water filter apparatus as claimed in claim 13, wherein the flushing means has, or is in operable engagement with, means for pressurising the flushing fluid prior to exit of the flushing fluid from the at least one outlet of the flushing means.

15. The water filter apparatus as claimed in claim 13, wherein the flushing means comprises a chamber, the chamber being enclosed and further comprising an opening in fluid connection with the inlet for receiving flushing fluid and at least one opening for allowing exit of flushing fluid from the chamber.

16. The water filter apparatus as claimed in claim 8, wherein the flushing means is manufactured from a one piece plastic component, or from a plurality of plastic components.

17. The water filter apparatus as claimed in claim 1, wherein all or part of a fluid carrying surface of the filter means is downwardly inclined in at least a widthwise direction towards the overflow output means, the overflow output means being disposed in the initial lengthwise direction of flow of water, but offset laterally with regards to the axial direction of the inlet.

18. The water filter apparatus as claimed in claim 1, wherein at least a portion of the outlet is locatable above the lowest point of the downwardly inclined filter means, but beneath at least a portion of the filter means.

19. The water filter apparatus as claimed in claim 1, wherein the inlet, filtered water outlet, or the outlet of the overflow output means are connectable to fluid conduits of a system into which the filter apparatus is integrated, the fluid conduits are connectable to the inlet, filtered water outlet, or the outlet of the overflow output means by push-on connection means, the push-on connection means have a seal means therein for creating a fluid proof seal between the fluid conduit and the inlet, filtered water outlet), or the outlet of the overflow output means.

20. The water filter apparatus as claimed in claim 1, wherein the water filter apparatus has ground engaging means and at least one positional adjustment means which can be adjusted to create a level or otherwise desired orientation of the filter apparatus.

21. The water filter apparatus as claimed in claim 1, wherein the filter means permits the passage of water therethrough while preventing the passage of debris and other such contaminants of the water, the filter means comprising a plate having cut-outs therein for allowing passage of fluid.

22. The water filter apparatus as claimed in claim 1, wherein the filter means is manufactured from a non-corrosive metallic material or a plastic material.

23. The water filter apparatus as claimed in claim 1, wherein the filter means is manufactured from a material having anti-microbial properties or is coated with an anti-microbial material.

24. The water filter apparatus as claimed in claim 1, wherein the water filter apparatus comprises an upper closure means for protecting the interior of the filter apparatus, including the filter means, from ingress of foreign matter, especially where the water filter apparatus is buried underground.

25. The water filter apparatus as claimed in claim 1, wherein the lowest portion of the outlet is disposed below the lowest portion of the inlet at a distance of between 150 mm and 250 mm inclusive, and most preferably at a distance of 80 mm, wherein the highest portion of the outlet is disposed below the lowest portion of the inlet at a distance of between 4 mm and 30 mm inclusive.

26. The water filter apparatus as claimed in claim 1, wherein the water filter apparatus has a filtered water delivery means for delivering filtered water from proximal the inlet to the filtered water outlet, wherein the filtered water delivery means comprises an inclined channel extending downwardly from a location below the inlet and filter means to the filtered water outlet, wherein the filtered water delivery means extends below all or a substantial part of the filter means.

* * * * *